Patented July 17, 1934

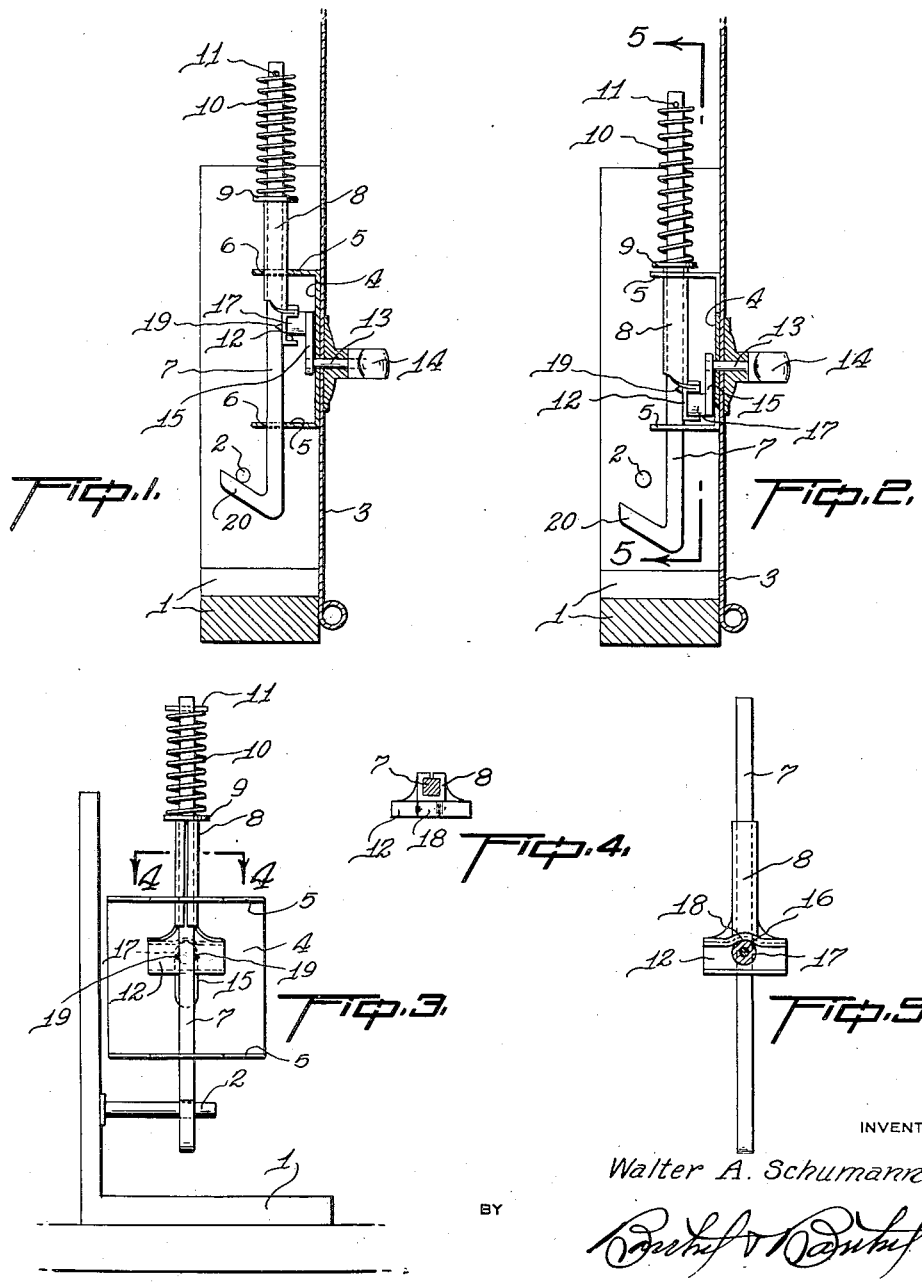

1,966,908

UNITED STATES PATENT OFFICE 1,966,908

HOOD FASTENER

Walter A. Schumann, Louisville, Ky., assignor to The Bade-Cummins Mfg. Co., Louisville, Ky., a corporation of Delaware Application June 20, 1931, Serial No. 545,753

7 Claims. (Cl. 292—124)

The present invention pertains to a novel hood fastener of the type designed particularly to hold down and lock the hood of a motor vehicle and is directed to the so-called "inside type" of fastener where the latching mechanism, with the exception of the operating handle, is concealed within the hood and usually carried by the hood.

The principal object of the invention is to provide a device of this character adapted to adjust itself to manufacturing tolerances where irregularities in the making and assembling of the various parts and to maintain a firm or non-rattling latching of the hood after having adjusted itself.

In keeping with this object, the device of the invention comprises a guide member or bracket carried by the movable closure or hood and slidably supporting a latch member adapted to engage a rigid retaining member. The latch member is actuated by a handled shaft journalled in the closure and having a crank, one end of which is received in a track slidably mounted on the latch member. Means are provided for communicating the oscillatory motion of the track to the latch member in either direction, whereby the latch member is engaged or disengaged with respect to the rigid retaining member by operation of the handle.

One of the special features of the invention consists in providing the crank with a roller at that portion which is received in the track, so that the rotary motion of the crank is translated into linear motion of the track lengthwise of the latch member without undue friction between these parts. Another characteristic of the invention is the provision of a sloped end on the latch member for engaging the rigid retaining member, whereby the locking movement of the latch also draws the closure member fixed thereto toward the retaining member.

The invention is fully disclosed by way of example in the following description and in the accompanying drawing in which—

Figure 1 is a vertical transverse section of an automobile hood, showing in elevation the device of the invention applied thereto and in locking position;

Fig. 2 is a similar section showing the latch in released position;

Fig. 3 is an elevation corresponding to Fig. 1, viewed from the inner side outwardly of the hood;

Fig. 4 is a section on the line 4—4 of Fig. 3; and

Fig. 5 is an elevation of the latch member and track member, taken on the plane of the line 5—5 of Fig. 2.

References to these views will now be made by use of like characters which are employed to designate corresponding parts throughout.

In Figs. 1, 2 and 3 the numeral 1 represents any fixed part of an automobile frame adjacent the hood and adapted to carry a rigid latch retaining member such as a stud 2 near the lower horizontal edge of the hood or closure 3 and at the inner side thereof. The member 2 lies parallel to the lower edge of the hood and preferably slightly above the same.

To the inner surface of the hood is secured a bracket 4 having upper and lower ears 5 which are apertured at 6 in vertical alignment. The ears thus constitute a guide for an elongated latch member 7 passed therethrough and slidably mounted therein. The latch member is surrounded by a shoe 8 slidable thereon and preferably passing through the upper aperture 6. A washer 9 surrounding the latch member 7 rests on the upper end of the shoe 8 and is engaged by the lower end of a coil spring 10, the upper end of which bears against a cotter pin 11 passed through the upper end of the latch member. This construction prevents the latch member from dropping out of the ears 5, and also accomplishes other functions which will presently be described.

The lower end of the shoe 8 is formed as a channel or track 12 lying transversely of the latch member 7. A shaft 13 is journalled in the back of the bracket 4, passing also through the hood 3, and is equipped with an operating handle 14 at the outer side of the hood. The end of the shaft within the bracket 4 carries a crank 15. A pin 16 extends from the free end of the crank parallel to the shaft 13, and on this pin is rotatably mounted a roller 17 adapted to ride in the track 12. The upper side of the track has an upward seat or indentation 18 adapted to receive the roller when the movable parts are in their uppermost or locking position. The latch member 7 is formed with stops 19, which may be struck out of the metal, below the shoe 8 and engageable by the lower end thereof. The locking end 20 of the latch 7 is sloped upwardly towards the retaining member 2, whereby to draw the hood 3 inwardly when the end 20 is moved upwardly against the retaining member.

In the use of the device, the handle 14 is turned to bring the roller 17 to its lowest position, as shown in Fig. 2, when it is desired to disengage the latch. In this position the end 20 is free from the stud 2, and the hood may be swung outwardly by pulling on the handle 14. To engage the latch, the handle 14 is turned in either direction until the roller reaches its uppermost position, which may be felt by the reception of the roller in the seat 18. The shoe 8 is raised with the roller, and this upward movement is transmitted to the latch member 7 by the spring 10 which becomes compressed and thus locks the seat 18 against the roller 17 with a positive force but in a yielding or resilient manner. The upward movement of the locking end 20 against the stud 2 obviously draws the hood member 3 to its limit against the bracket 1 or some other stop carried by the frame of the vehicle. The final position of the end 20 relative to the stud 2 is variable according to the relative positions of the retaining member and stop. This relation may vary within manufacturing and assembly tolerances, but in any event it is compensated by the various positions which the locking end 20 may assume with relation to the stud 2. The seating of the roller 17 in the depression 18 under the compression of the spring 10 holds the roller against displacement during the travel and vibration of the vehicle and further prevents the various parts of the latch from rattling inasmuch as the locking end 20 is held against the stud 2 under spring tension.

In disengaging the latch, the handle 14 must be turned with sufficient force to carry the roller 17 away from the seat 18. As the roller moves along the track 2, the spring expands, and the continued turning of the handle and downward movement of the shoe 8 brings the lower end of the shoe into engagement with the stops 19, whereby the locking end 20 is positively carried out of engagement with the stud 2 on the final downward movement of the roller 17. It may be noted in this connection that the provision of the roller 17 on the free end of the crank 15 avoids undue and excessive friction against the sides of the track 12, particularly the upper side.

As will be seen all portions of the fastening carried by the hood are within the length of the latch member 7. In other words, the shoe or sleeve element 8 is located intermediate the ends of the latch member, with the shoe having free movement relative to the limit position fixed by the stops 19 carried by the latch member. Hence, the sleeve or shoe 8 can move relatively to the latch member toward and away from this limit position, but can travel only with the latch member when in such limit position. The movement of the sleeve or shoe away from its limit position is, of course, subject to the tension of spring 10, any movement from the limit position serving to increase the tension of spring 10.

As a result, it will be seen that when the operating member 14 is rotated to shift the fastening from the position of Fig. 1, the latch member 7 retains its position relative to retaining member 2 during the earlier part of the rotation—until the rotation has permitted the shoe 8 to move downward on the latch member to the point where it reaches its limit position in contact with the stops 19; during this period, the tension of the spring 10 retains the latch member from moving downward, the spring simply expanding. When, however, the rotation of the operating member has placed the shoe in its limit position, further rotation of the operating member moves the shoe and latch member as a unit, to carry the latch member out of engagement with the retaining member 2, thus freeing the hood. Obviously, when the shoe reaches its limit position during this movement, the spring becomes inactive as a power device, since its expansion is then at its maximum, so that the continued movement is simply that of the unit, the weight of which is comparatively small and therefore unlikely to be effective to force rapid downward movement of the unit.

On the return movement of the fastening, the power of roller 17, is applied to the shoe 8 in a direction which would tend to move the shoe away from such limit position, but the presence of spring 10 and its tension will cause the latch member 7 to rise with it until its hook 20 engages the retaining member 2, so that during this period the unit characteristic is preserved, although the shoe is free to move away from its limit position. When, however, the hook 20 engages the member 2, the upward movement of member 7 ends, excepting as may be permitted by the incline of the hook as the hood is tightened to position; the remainder of the return rotation of the operating member serves to again shift the shoe from its limit position, such shift serving to increase the tension of spring 10.

From this it can be understood that the fastening is not released until the spring has lost all power to cause fastening movement, so that the release movements are entirely under the control of the operator, with no liability of the latch member moving other than as desired. And, on the return action, the actual tightening action, although produced by the operating member, is actually controlled by the tension of spring 10, so that the operator cannot apply force with a view to forcing parts to position, so that there is little likelihood of a breakage of parts. An additional advantage in the latter respect is the fact that the operator is free to snap the operating member to its position, after closing the hood, the spring 10 serving to provide the final closing and tightening action. In other words, the arrangement prevents the application of the force of the operator to move the parts in a direction which could damage the hook or the retaining member during the closing operation; in the opening operation, the spring tends to aid the operator in the initial movements of the rotation, thus aiding in the bringing the shoe to its limit position.

The advantage of the structure in the lines of production is readily understood. The length of the movement of the hook 20 away from the member 2 requires no definite amount except that it be sufficient to clear the member 2. Since the opposite action is provided by the spring 10, there is no necessity for precision in distances, etc., so that the precision allowances which are permissible under large production conditions, will not affect the operation of the structure in use.

Although a specific embodiment of the invention has been illustrated and described, it will be apparent that various alterations in the details of construction may be made without departing from the scope of the invention as indicated by the appended claims.

What I claim is:—

1. In a hood fastener, a guide, a latch member slidably mounted therein, a shoe slidable on said member, a transverse track carried by said shoe, a shaft journalled relatively to said guide, a crank on said shaft and having a portion adapted to travel across said track whereby to move said shoe on said latch member, a spring interposed between said shoe and latch at one end of said shoe for transmitting the motion of said shoe to said latch member, and a seat in said track adapted to receive said crank in upright position against the pressure of said spring.

2. In a hood fastener, a guide, a latch member slidably mounted therein, a shoe slidable on said member, a transverse track carried by said shoe, a shaft journalled relatively to said guide, a crank on said shaft and having a roller received in and adapted to ride across said track whereby to move said shoe on said latch member, and a spring interposed between said shoe and latch at one end of said shoe for transmitting the motion of said shoe to said latch member, and a seat in said track adapted to receive said roller when said crank is in upright position and under the pressure of said spring.

3. In hood fasteners of the inside type, wherein the fastener mechanism and the latch-retaining member are concealed by the closed hood with the operating mechanism exposed, a guide carried by the hood, a latch member slidable therein and having an end zone adapted to engage the retaining member to retain the hood fastened, an element carried intermediate the ends of and movable longitudinally relative to the latch member with the relative movement in one direction limited by the latch member, a spring operatively engaging the latch member and element and active in a direction to tend to retain the element in such limit position and permit element movement relative to the latch member away from such limit position, and means operatively engaging said element and operative externally of the hood for controlling the movements of element and latch member, said means being operative to retain the element spaced from its limit position when the latch member is engaged with its retaining member with the latch member held tensioned by the spring, said means also being operative to move the element and latch member as a unit to disengage the retaining member when means movement has restored the element to its limit position by relative movement of latch member and element.

4. A fastener as in claim 3 characterized in that the element carries a track with which the operating means engages, with the track arranged to co-operate with the means movement in completing the cycle of element and member movements.

5. A fastener as in claim 3 characterized in that the operating means includes an arm movable about an axis with the free end of the arm co-operating with the element in providing the cycle of operation by rotative movements of the arm about its axis.

6. A fastener as in claim 3 characterized in that the element is in the form of a sleeve carried by the latch member, with the sleeve carrying a track, the operating means including an arm swingable about an axis, with the free end of the arm carrying means engageable with the track to provide the cycle of movements by such swinging movement of the arm.

7. A fastener as in claim 3 characterized in that the element includes a sleeve carried by the latch member with the latter carrying a stop located to contact the sleeve and limit the relative movement of sleeve and latch member in the direction of latch member release, whereby movement of the means will initially produce such contact by the relative movement of sleeve and latch member and produce the release movement of latch member by the concurrent movement of sleeve and latch member.

WALTER A. SCHUMANN.